United States Patent
Kunieda et al.

(10) Patent No.: US 10,265,626 B2
(45) Date of Patent: Apr. 23, 2019

(54) SYSTEM AND METHOD FOR MAKING FREE-TO-PLAY AND ACTIVITY SUGGESTIONS

(71) Applicant: Sony Interactive Entertainment LLC, San Mateo, CA (US)

(72) Inventors: Shunsuke Kunieda, San Francisco, CA (US); Yumiko Tanaka, San Mateo, CA (US); Daisuke Kawamura, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 15/453,773

(22) Filed: Mar. 8, 2017

(65) Prior Publication Data
US 2018/0256982 A1 Sep. 13, 2018

(51) Int. Cl.
*A63F 13/795* (2014.01)
*G06F 17/30* (2006.01)
(Continued)

(52) U.S. Cl.
CPC ............ *A63F 13/795* (2014.09); *A63F 13/33* (2014.09); *A63F 13/60* (2014.09);
(Continued)

(58) Field of Classification Search
CPC .. A63F 13/12; A63F 2300/8082; G07F 17/32; G06F 9/30036
See application file for complete search history.

(56) References Cited

U.S. PATENT DOCUMENTS

| 8,328,639 B2 * | 12/2012 | Nickell ............ A63F 13/12 463/40 |
| 2008/0287198 A1 * | 11/2008 | Callery ............ G07F 17/32 463/42 |

FOREIGN PATENT DOCUMENTS

| CA | 2569604 | 6/2008 | |
| WO | WO 2013091068 A1 * | 6/2013 | ............ G06Q 10/00 |

(Continued)

OTHER PUBLICATIONS

PCT Application No. PCT/US2018/021569 International Search Report and Written Opinion dated May 8, 2018.
(Continued)

*Primary Examiner* — Omkar Deodhar
*Assistant Examiner* — Ross Williams
(74) *Attorney, Agent, or Firm* — Polsinelli LLP

(57) ABSTRACT

The subject disclosure relates to methods for making user activity recommendations. In some aspects, a process of the technology can include operations for receiving a free-to-play indication, the free-to-play indication specifying availability of a user associated with a media system, retrieving, via the network interface, peer information indicating an availability of one or more online peers of the user, and retrieving, via the network interface, activity information indicating one or more activities available to the user, and at least one of the online peers. In some aspects method can further include operations for providing an activity recommendation to the user based on the peer information and the activity information, wherein the activity recommendation includes a suggestion of at least one activity that can be conducted by the user with the media system. Systems and computer-readable media are also provided.

20 Claims, 4 Drawing Sheets

(51) Int. Cl.
*A63F 13/33* (2014.01)
*A63F 13/60* (2014.01)

(52) U.S. Cl.
CPC .... *G06F 17/3087* (2013.01); *G06F 17/30345* (2013.01); *G06F 17/30424* (2013.01)

(56) References Cited

FOREIGN PATENT DOCUMENTS

| WO | WO 2015/031065 | 3/2015 |
| WO | WO 2018/165441 | 9/2018 |

OTHER PUBLICATIONS

PCT/US18/21569, filed Mar. 8, 2018, System and Method For Makign Free-to-Play and Activity Suggestions.

\* cited by examiner

SYSTEM AND METHOD FOR MAKING FREE-TO-PLAY AND ACTIVITY SUGGESTIONS

BACKGROUND

1. Technical Field

Aspects of the subject technology relate to providing user/player activity recommendations that the user can use to fill indicated periods of free time. Some aspects of the technology also provide recommendations regarding friends or peers that are available to participate or collaborate in the recommended activity.

2. Introduction

Rapid growth of the Internet and the consequential proliferation of online gaming systems have resulted in significant changes in the number and type of collaborative activities with which online users engage. In addition to online games, vendors provide, music, movies, social networking streams and other media for consumption via specialized applications (e.g., "apps") executed on a personal computing platform, such as a console system, personal computer, smartphone, and/or tablet device, etc. To increase media consumption, content distributors, such as Netflix have an incentive to provide targeted recommendations for additional content items that may be of interest to the user.

SUMMARY OF THE CLAIMED INVENTION

Embodiments of the invention include systems and methods for making activity recommendations. Such systems may include one or more processors, an input device coupled to the one or more processors, a network interface coupled to the one or more processors, and non-transitory memory storing instructions for receiving, via the input device, a free-to-play indication, the free-to-play indication specifying availability of a user associated with the media system, retrieving, via the network interface, peer information indicating an availability of one or more online peers of the user; retrieving, via the network interface, activity information, the activity information indicating one or more activities available to the user and at least one of the online peers; and providing an activity recommendation to the user based on the peer information and the activity information, wherein the activity recommendation comprises a suggestion of at least one activity that can be conducted by the user with the media system.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
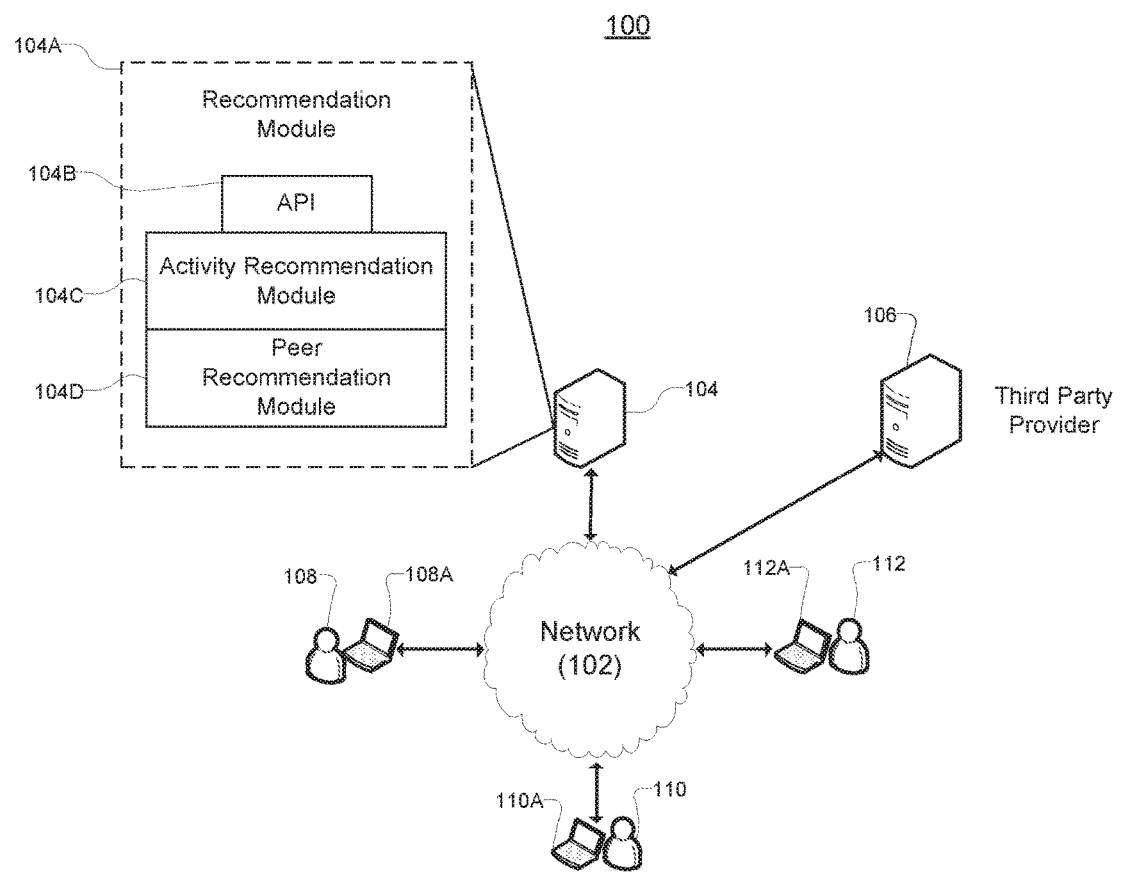
FIG. 1 illustrates an example environment in which some aspects of the technology can be implemented.

The detailed description set forth below is intended as a description of various configurations of the disclosed technology and is not intended to represent the only configurations in which the technology can be practiced. The appended drawings are incorporated herein and constitute a part of the detailed description. The detailed description includes specific details for the purpose of providing a more thorough understanding of the technology. However, it will be clear and apparent that the technology is not limited to the specific details set forth herein and may be practiced without these details. In some instances, structures and components are shown in block diagram form in order to avoid obscuring the concepts of the subject technology.

Although content distributors typically provide recommendations regarding the content they provide, such recommendations do not take consideration of general user activity preferences or preferences for consumption of media from other sources. Additionally, media consumption recommendations (e.g., Netflix movie recommendations) do not account for the collaborative nature of user engagement with certain content types, such as, watching a movie or playing an online game with a friend.

For computing platforms that tie together different content types from different providers (e.g., games, movies, music, and/or social media feeds, etc.), general user preferences can be given precedence over the incentive to promote a particular service. Accordingly, there exists a need to provide accurate user activity recommendations in conjunction with recommendations regarding peer availability for potential collaboration.

Aspects of the disclosed technology address the foregoing need by providing ways to make targeted user activity recommendations. Activity recommendations can be provided in conjunction with a friend/user suggestion, for example, to suggest an available peer that may be interested in participating in the recommended activity (e.g., playing a game, or watching a television show). By providing accurate and generalized activity recommendations, user engagement with the computing platform (e.g., game console system) can be encouraged, while also improving the user experience though enhanced peer-to-peer collaboration.

Aspects of the technology involve determinations of activity recommendations and/or peer recommendations made in response to a user's "free-to-play" indication. As used herein, a free-to-play indication can include any signal used to make inferences regarding free periods of time in which the user may be interested in participation in a suggested activity. Free-to-play indications can include explicit user inputs to indicate a start time, a stop time, and/or a time duration in which he/she is free to participate in a suggested activity. In other aspects, free-to-play indications can be signals inferred from historic user behaviors, and/or behaviors of other similarly situated users. For example, free-to-play indications may be outputs resulting from a machine-learning algorithm, such as a neural network, configured to make inferences regarding a likelihood of player availability.

In response to a free-to-play indication, systems of the instant technology can provide recommendations for activities or media content a user may be interested in consuming via their associated device, such as, a game console system. It is understood that the processing required to make activity and online peer recommendations can be performed by the user's computing device, or performed using one or more remote systems, such as servers or computing clusters. As explained in further detail below, systems of the technology can also be configured to pull information from one or more third party networks, systems, or services, without departing from the scope of the technology. For example, through account binding (e.g., with a user's Netflix, Pandora, and/or Facebook accounts, etc.), computing systems used to implement the invention can retrieve data necessary to make activity and peer recommendations.

FIG. 1 illustrates an example environment 100 in which some aspects of the technology can be implemented. Environment 100 includes network 102, that permits communication between recommendation system 104, third-party provider 106, and users 108, 110, and 112, e.g., via respective computing devices 108A, 110A, and 112A. Recommendation system 104 contains recommendation module 104A that includes various hardware/software modules for implementing aspects of the technology, including, application programming interface 104B, Activity Recommendation Module 104C and Peer Recommendation Module 104D.

It is understood that the system architecture of environment 100 is intended to conceptually illustrate various functional components used to provide activity and/or peer recommendations. However, a greater or fewer number of hardware and/or software components can be implemented. For example, recommendation system 104 could include multiple computing devices (e.g., servers), as part of a network (e.g., an online gaming network), or as part of a distributed computing system. Additionally, users/players 108, 110, and 112, are intended to help illustrate aspects of the technology that relate to a multi-user platform or gaming environment; a greater number of players may be included, without departing from the scope of the technology.

Computing devices 108A, 110A, and 112A, can include any of a variety of processor-based system types, including but not limited to one or more of: gaming console/s, smartphone/s, tablet computing device/s, personal computer/s, and/or personal desktop assistant/s (PDAs), or the like. Additionally, as discussed in further detail below, activity recommendation module 104C, and peer recommendation module 104D can be implemented as separate software routines and/or hardware systems, e.g., for providing different recommendations. Alternatively, activity recommendation module 104C and peer recommendation module 104D can be implemented as part of the same software system, e.g., instantiated on similar virtual machines, or as portions of the same machine-learning platform.

In practice, recommendation system 104 receives a free-to-play indication corresponding with an indication of the player's (e.g., user/player 108) period of availability. The free-to-play indication can be received as a direct result of user input provided to computing device 108 (e.g., using a console controller or other input device), or as an inference drawn regarding a likelihood of user availability by recommendation module 104A.

By way of example, user 108 can use a controller of game console 108A to indicate that he/she is available for the three hours beginning at 2 PM. Based on the received, free-to-play indication, recommendation system 104 can begin aggregating information and performing processing needed to provide an activity recommendation to user 108, e.g., pertaining to activities that can fill the indicated three hour window. For example, recommendation system 104 can pull data (i.e., activity information) from one or more media accounts of user 108, e.g., from third party provider 106, using API 104B. Information pulled by recommendation system 104 can include user history information, for example, pertaining to user purchases, content accessed (e.g., games played, music downloaded or movies watched, etc.), and/or social media information (e.g., friend lists, feeds, and/or social graphs, etc.), from third party provider 106. Recommendation system 104 can also access free-to-play indications provided by other users, such as users 110, and/or 112.

Processing of activity information is then performed to identify one or more suggested activities for user 108. Activity information processing can be performed exclusively by recommendation system 104, for example, using activity recommendation module 104/peer recommendation module 104D. Alternatively, processing can be performed at the associated user device, such as, console system 108, or a combination thereof.

Subsequently, an activity recommendation is provided to user 108 indicating a suggestion of at least one activity that can be conducted by the user with media system 108A during the user's free time. Additionally, the activity recommendation can include an indication of at least one other user, such as user 110 that can participate in the recommended activity.

Further to the above example, recommendation system 104 may determine that user 108 is on level four of a specific game title that is also played by user 110. Based on similar progress in the game title, as well as an overlapping availability as indicated by a free-to-play indication provided by user 110, activity recommendation system can provide user 108 with an activity recommendation that he/she resume play of game title with user 110 at 2 PM. In this example the activity recommendation may omit mention of user 112 for any of a variety of reasons. For example, user 112 may not be available during the indicated time period, or may not be a player of the game title. Alternatively, based on activity history information and/or social history information of one or more of uses 108, 110, and/or 112, it may be determined that user 108 does not like to play the game title with user 112. Or that user 108 has a strong affinity for playing the game title with user 110, etc.

Figure 2:
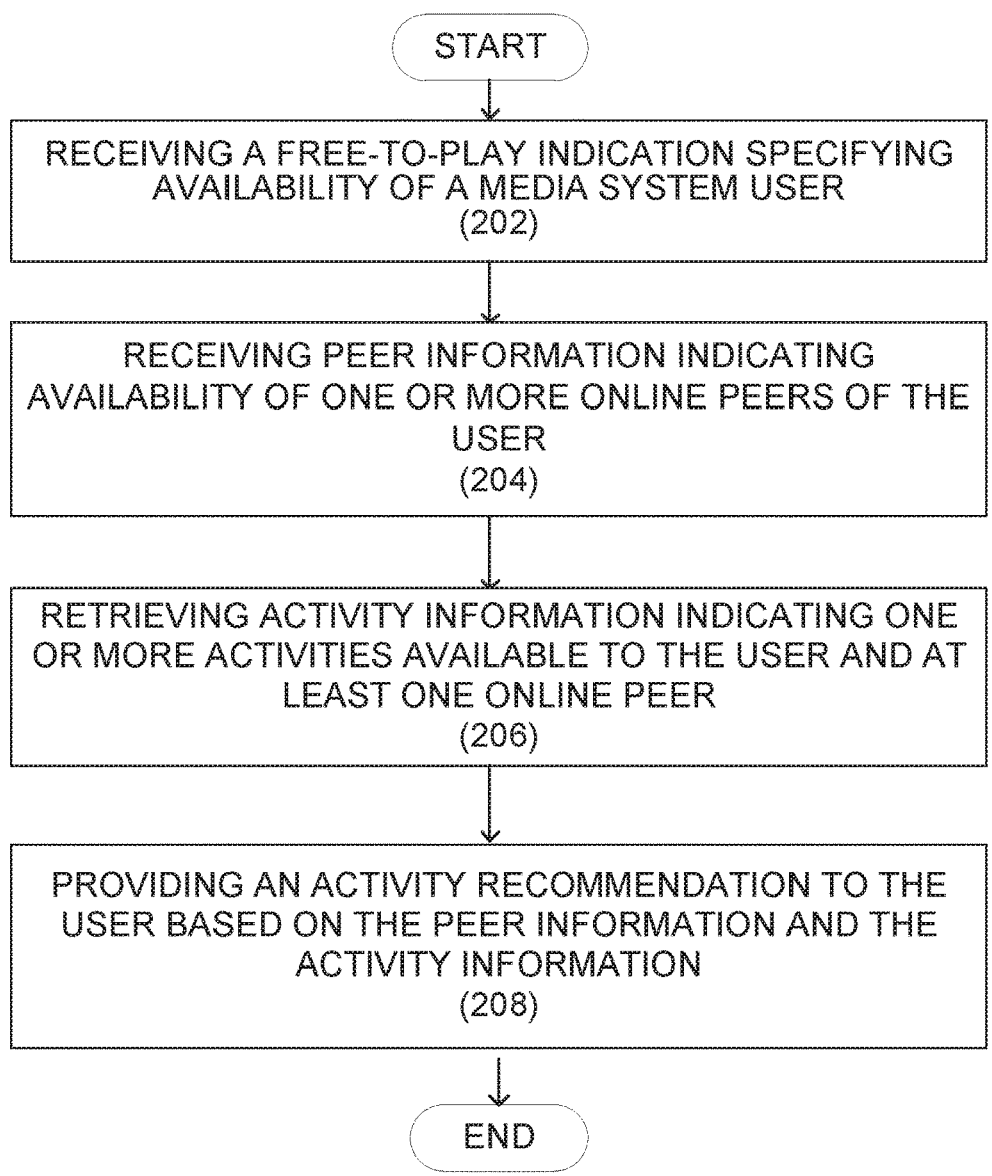
FIG. 2 illustrates steps of an example process for providing user activity recommendations, according to some aspects of the technology.

FIG. 2 illustrates steps of an example process 200 for providing user activity recommendations, according to some aspects of the technology. Process 200 begins with step 202 in which a free-to-play indication is received e.g., by a recommendation system (e.g., recommendation system 104). As discussed above, the free-to-play indication can be issued by a user via an associated processor-based device (e.g., a game console system or personal computer), or received by a recommendation system (e.g., recommendation system 104, discussed above). The free-to-play indication provides at least an indication of the user's availability, for example, to play an online game, watch a movie, or participate in another activity facilitated by an associated user computing system.

In step 204, peer information is received indicating availability of one or more online peers of the user. As with free-to-play information, peer information can be based on free-to-play indications provided by one or more online peers, e.g., via an associated device or gaming system. Alternatively, peer information can be information inferred about the availability of online peers, for example, using a machine-learning algorithm configured to process data pertaining to the online peers, such as, relating to previous peer activities, or online peer-to-peer interactions.

At step 206, activity information is retrieved indicating one or more activities available to the user and at least one online peer. Activity information can be received either directly from the users/online peers (e.g., via associated gaming consoles), and/or from one or more third party providers, e.g., via an API configured to facilitate the transfer of information from a bound third-party account to the recommendation system.

Activity information can include any data received/retrieved from one or more content providers, such as Facebook, Netflix, Pandora, and/or Twitch, etc. As such, activity information can contain not only indications of activities (e.g., games) or media (movies, or songs, etc.) that the user may wish to consume, but also social data (e.g., social history information) that can be used to determine which online peers a user may be most interested in participating with.

Subsequently, at step 208, an activity recommendation is provided to the user based on the peer information and the activity information. The activity recommendation can be based on processing performed on activity information associated with the user to determine a section of at least one activity, from among multiple activities, that are available to the user. Similarly, the activity recommendation can be based on processing performed on social history information associated with the user to determine a selection of online peers, with whom the user may be interested in collaborative activities, i.e., online game play, or movie watching, etc. As such, the activity recommendations may include singular recommendations such as a single activity recommendation, or a single activity/single peer recommendation. Alternatively, activity recommendations may provide a list of a few activates and/or online peers that may be of interest to the user.

After the user is provided with an activity of recommendation to fill his/her free-to-play time slot, a user selection can be received. For example the user can select an activity, such as a particular TV show episode to watch, or may select an activity in conjunction with a particular online peer. By way of example, the user may elect to play a particular video game title with a selected online peer, e.g., who has achieved similar progress in the game, resulting in an automatic invite being sent to the online peer.

In some aspects, the user's activity/online peer selection can be sued to update social history information and/or activity history information that is associated with either the user, and/or one or more of the online peers. Through the constant updating of activity history information and social history information, adaptive machine-learning approaches may be implemented to offer continuous improvements to the provided activity recommendations.

Figure 3:
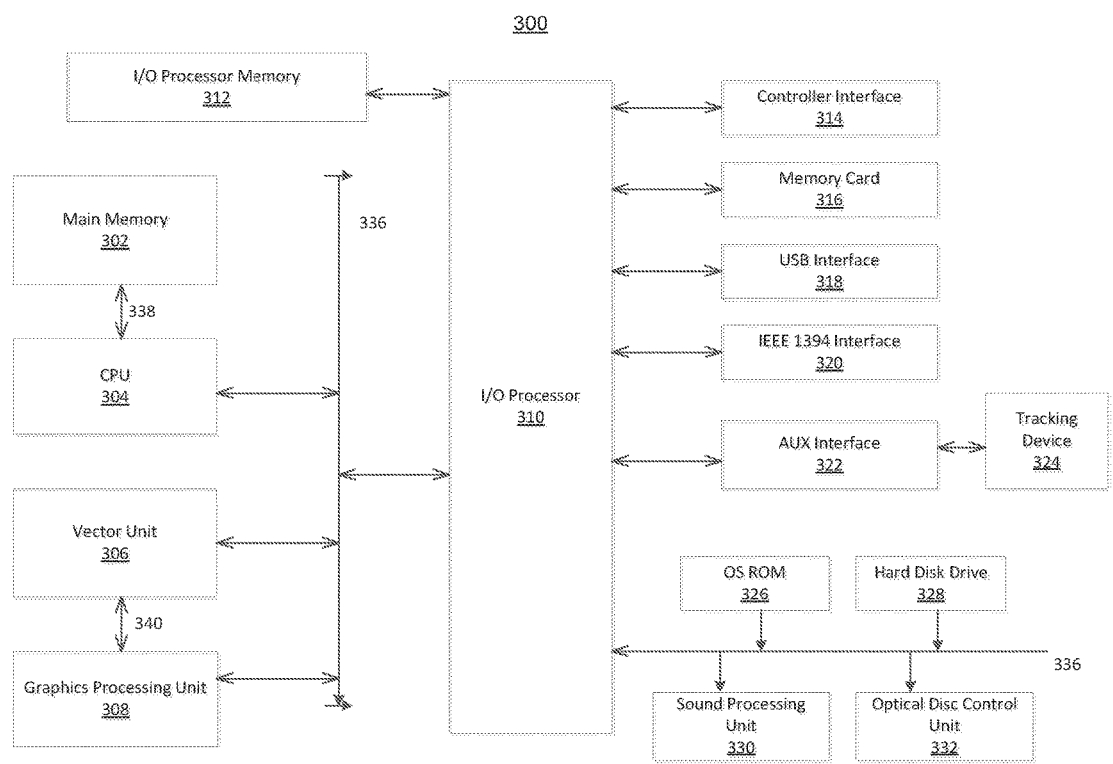
FIG. 3 illustrates an example of an electronic system with which some aspects of the subject technology can be implemented.

FIG. 3 is an exemplary user device 300. User device 300 (e.g., desktop, laptop, tablet, mobile device, console gaming system) is a device that the user can utilize to facilitate carrying out features of the present invention pertaining communication with a recommendation system (e.g., recommendation system 104), as discussed above.

User device 300 can include various elements as illustrated in FIG. 3. It should be noted that the elements are exemplary and that other embodiments may incorporate more or less than the elements illustrated. With reference to FIG. 3, the user device 300 includes a main memory 302, a central processing unit (CPU) 304, at least one vector unit 306, a graphics processing unit 308, an input/output (I/O) processor 310, an I/O processor memory 312, a controller interface 314, a memory card 316, a Universal Serial Bus (USB) interface 318, and an IEEE 1394 interface 320, an auxiliary (AUX) interface 322 for connecting a tracking device 324, although other bus standards and interfaces may be utilized. The user device 300 further includes an operating system read-only memory (OS ROM) 326, a sound processing unit 328, an optical disc control unit 330, and a hard disc drive 332, which are connected via a bus 334 to the I/O processor 310. The user device 300 further includes at least one tracking device 324.

Tracking device 324 can be a camera, which includes eye-tracking capabilities. The camera may be integrated into or attached as a peripheral device to user device 300. In some eye-tracking device implementations, infrared non-collimated light is reflected from the eye and sensed by a camera or optical sensor. The information is then analyzed to extract eye rotation from changes in reflections. Camera-based trackers focus on one or both eyes and record their movement as the viewer looks at some type of stimulus. Camera-based eye trackers use the center of the pupil and light to create corneal reflections (CRs). The vector between the pupil center and the CR can be used to compute the point of regard on surface or the gaze direction. A simple calibration procedure of the viewer is usually needed before using the eye tracker.

Alternatively, more sensitive trackers use reflections from the front of the cornea and that back of the lens of the eye as features to track over time. Even more sensitive trackers image features from inside the eye, including retinal blood vessels, and follow these features as the eye rotates. Most eye tracking devices use a sampling rate of at least 30 Hz, although 50/60 Hz is most common. Some tracking devises run as high as 1250 Hz, which is needed to capture detail of very rapid eye movement.

A range camera may instead be used with the present invention to capture gestures made by the user and is capable of facial recognition. A range camera is typically used to capture and interpret specific gestures, which allows a hands-free control of an entertainment system. This technology may use an infrared projector, a camera, a depth sensor, and a microchip to track the movement of objects and individuals in three dimensions. This user device may also employ a variant of image-based three-dimensional reconstruction.

The tracking device 324 may include a microphone integrated into or attached as a peripheral device to user device 300 that captures voice data. The microphone may conduct acoustic source localization and/or ambient noise suppression.

Alternatively, tracking device 324 may be the controller of the user device 300. The controller may use a combination of built-in accelerometers and infrared detection to sense its position in 3D space when pointed at the LEDs in a sensor nearby, attached to, or integrated into the console of the entertainment system. This design allows users to control functionalities of the user device 300 with physical gestures as well as button-presses. The controller connects to the user device 300 using wireless technology that allows data exchange over short distances (e.g., 30 feet). The controller may additionally include a "rumble" feature (i.e., a shaking of the controller during certain points in the game) and/or an internal speaker.

The controller may additionally or alternatively be designed to capture biometric readings using sensors in the remote to record data including, for example, skin moisture, heart rhythm, and muscle movement.

As noted above, the user device 300 may be an electronic gaming console. Alternatively, the user device 300 may be implemented as general-purpose computer, a set-top box, or a hand-held gaming device. Further, similar user devices may contain more or less operating components.

CPU 304, vector unit 306, graphics processing unit 308, and I/O processor 310 communicate via system bus 336. Further, the CPU 304 communicates with the main memory 302 via a dedicated bus 338, while the vector unit 306 and the graphics processing unit 308 may communicate through a dedicated bus 340. The CPU 304 executes programs stored in the OS ROM 326 and the main memory 302. The main memory 302 may contain pre-stored programs and programs transferred through the I/O Processor 310 from a CD-ROM, DVD-ROM, or other optical disc (not shown) using the optical disc control unit 332. The I/O processor 310 primarily controls data exchanges between the various devices of the user device 300 including the CPU 304, the vector unit 306, the graphics processing unit 308, and the controller interface 314.

Graphics processing unit 308 executes graphics instructions received from the CPU 304 and the vector unit 306 to produce images for display on a display device (not shown). For example, the vector unit 306 may transform objects from three-dimensional coordinates to two-dimensional coordinates, and send the two-dimensional coordinates to the graphics processing unit 308. Furthermore, the sound processing unit 330 executes instructions to produce sound signals that are outputted to an audio device such as speakers (not shown).

A user of the user device 300 provides instructions via the controller interface 314 to the CPU 304. For example, the user may instruct the CPU 304 to store certain information on the memory card 316 or instruct the user device 300 to perform some specified action.

Other devices may be connected to the user device 300 via the USB interface 318, the IEEE 1394 interface 320, and the AUX interface 322. Specifically, a tracking device 324, including a camera or a sensor may be connected to the user device 300 via the AUX interface 322, while a controller may be connected via the USB interface 318.

Figure 4:
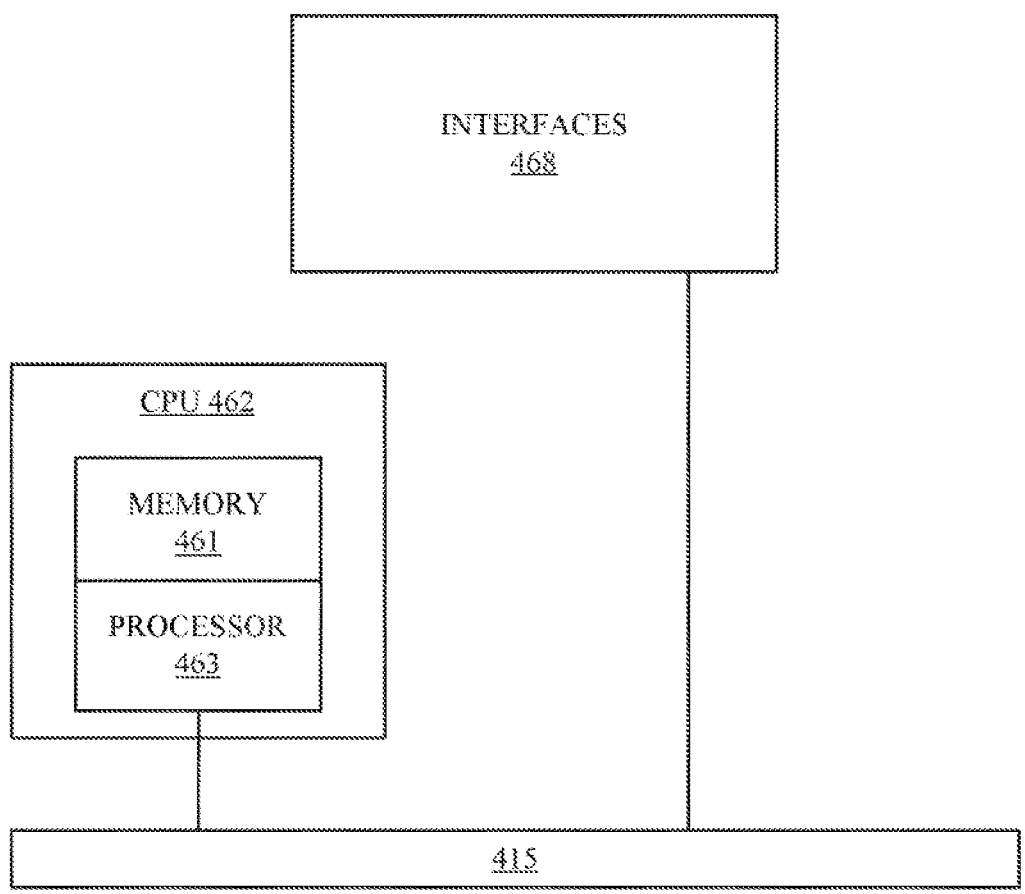
FIG. 4 illustrates an example of a network device that can be used to implement some aspects of the technology.

FIG. 4 illustrates an example network device 410 according to some embodiments. Network device 410 can be used to implement one or more servers or remote computing devices, such recommendation system 104, discussed above with respect to FIG. 1. Network device 410 includes a master central processing unit (CPU) 462, interfaces 468, and a bus 415 (e.g., a PCI bus). When acting under the control of appropriate software or firmware, the CPU 462 is responsible for executing packet management, error detection, and/or routing functions. The CPU 462 preferably accomplishes all these functions under the control of software including an operating system and any appropriate applications software. CPU 462 may include one or more processors 463 such as a processor from the Motorola family of microprocessors or the MIPS family of microprocessors. In an alternative embodiment, processor 463 is specially designed hardware for controlling the operations of router 410. In a specific embodiment, memory 461 (such as non-volatile RAM and/or ROM) also forms part of CPU 462. However, there are many different ways in which memory could be coupled to the system.

Interfaces 468 are typically provided as interface cards (sometimes referred to as "line cards"). Generally, they control the sending and receiving of data packets over the network and sometimes support other peripherals used with the router 410. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 462 to efficiently perform routing computations, network diagnostics, security functions, etc.

Although the system shown in FIG. 4 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 461) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A media system for making activity recommendations, the media system comprising:
   one or more processors;
   an input device coupled to the one or more processors;
   a network interface coupled to the one or more processors; and
   a non-transitory memory coupled to the one or more processors, the memory comprising instructions, which when executed by the processors, cause the processors to perform operations comprising:
      receiving information regarding a user via the input device, the received information including a historic user evaluation and data from one or more media accounts of the user;
      predicting an availability of the user based on the historic user evaluation to yield a free-to-play indication;
      retrieving, via the network interface, peer information indicating an availability of one or more online peers of the user;
      retrieving, via the network interface, activity information indicating one or more activities available to the user and at least one of the online peers based on the free-to-play indication and the availability of the at least one online peer of the user;
      generating an activity recommendation based on the peer information, the media accounts data, and the activity information, wherein the activity recommendation comprises a suggestion of at least one of the activities available to the user and the at least one online peer; and
      providing the generated activity recommendation to the user.

2. The media system of claim 1, wherein the activity recommendation further comprises a suggestion of at least one online peer of the user with whom the at least one activity can be conducted.

3. The media system of claim 1, wherein providing the activity recommendation further comprises:
   selecting the at least one activity from a plurality of activities available to the user and the at least one online peer based at least in part on activity history information associated with the user.

4. The media system of claim 1, wherein providing the activity recommendation further comprises:
   selecting at least one online peer, from among a plurality of online peers associated with the user, based on social history information associated with the user.

5. The media system of claim 1, further comprising:
   receiving, via the input device, an activity selection from the user; and
   updating activity history information associated with the user based on the activity selection.

6. The media system of claim 1, further comprising:
   receiving, via the input device, a peer selection from the user; and
   updating social history information associated with the user based on the peer selection.

7. The media system of claim 1, wherein the free-to-play indication indicates at least one of: a beginning time, and a duration of time that the user is available.

8. A method for making activity recommendations, the method comprising:
   receiving information regarding a user, the received information including a historic user evaluation and data from one or more media accounts of the user;
   predicting an availability of the user based on the historic user evaluation to yield a free-to-play indication;
   retrieving peer information indicating an availability of one or more online peers of the user;
   retrieving activity information indicating one or more activities available to the user and at least one online peer based on the free-to-play indication and the at least one online peer;
   generating an activity recommendation based on the peer information, the media accounts data, and the activity information, wherein the activity recommendation comprises a suggestion of at least one of the activities available to the user and the at least one online peer; and
   providing the generated activity recommendation to the user.

9. The method of claim 8, wherein the activity recommendation further comprises a suggestion of at least one online peer of the user with whom the at least one activity can be conducted.

10. The method of claim 8, wherein providing the activity recommendation further comprises selecting the at least one activity available to the user and the at least one online peer from a plurality of available activities based at least in part on activity history information associated with the user.

11. The method of claim 8, wherein providing the activity recommendation further comprises selecting at least one online peer, from among a plurality of online peers associated with the user, based on social history information associated with the user.

12. The method of claim 8, further comprising:
   receiving an activity selection from the user; and
   updating activity history information associated with the user based on the activity selection.

13. The method of claim 8, further comprising:
   receiving a peer selection from the user; and
   updating social history information associated with the user based on the peer selection.

14. The method of claim 8, wherein the free-to-play indication indicates at least one of:
   a beginning time, and a duration of time that the user is available.

15. A non-transitory computer-readable storage medium, having embodied thereon a program executable by a processor to perform a method for making activity recommendations, the method comprising:
   receiving information regarding a user, the received information including a historic user evaluation and data from one or more media accounts of the user;
   predicting an availability of the user based on the historic user evaluation to yield a free-to-play indication;
   retrieving peer information indicating an availability of one or more online peers of the user;
   retrieving activity information indicating one or more activities available to the user and at least one of the online peers based on the free-to-play indication and the availability of at the at least one online peer;
   generating an activity recommendation based on the peer information, the media accounts data, and the activity information, wherein the activity recommendation comprises a suggestion of at least one of the activities available to the user and the at least one online peer; and providing the generated activity recommendation to the user.

16. The non-transitory computer-readable storage medium of claim 15, wherein the activity recommendation further comprises a suggestion of at least one online peer of the user with whom the at least one activity can be conducted.

17. The non-transitory computer-readable storage medium of claim 15, wherein providing the activity recommendation further comprises:

selecting the at least one activity available to the user and the at least one online peer from a plurality of available activities based at least in part on activity history information associated with the user.

18. The non-transitory computer-readable storage medium of claim 15, wherein providing the activity recommendation further comprises selecting at least one online peer, from among a plurality of online peers associated with the user, based on social history information associated with the user.

19. The non-transitory computer-readable storage medium of claim 15, further comprising instructions for:

receiving an activity selection from the user; and updating activity history information associated with the user based on the activity selection.

20. The non-transitory computer-readable storage medium of claim 15, further comprising instructions for:

receiving a peer selection from the user; and updating social history information associated with the user based on the peer selection.

* * * * *